United States Patent [19]

Wüllenkord

[11] Patent Number: 4,505,865

[45] Date of Patent: Mar. 19, 1985

[54] STEAM-PRESSURE REDUCTION VALVE

[75] Inventor: Kurt Wüllenkord, Bielefeld, Fed. Rep. of Germany

[73] Assignee: Holter Regelarmaturen GmbH & Co. Kg, Scholss Holte-Stukenbrock, Fed. Rep. of Germany

[21] Appl. No.: 572,736

[22] Filed: Jan. 20, 1984

[30] Foreign Application Priority Data

Feb. 10, 1983 [DE] Fed. Rep. of Germany ....... 3304523

[51] Int. Cl.³ ................................................. B01F 3/04
[52] U.S. Cl. ................................. 261/44 R; 261/44 A; 261/78 A; 261/76; 261/DIG. 13; 137/625.4; 137/898
[58] Field of Search ............... 261/DIG. 13, 76, 78 A, 261/44 R, 44 A; 137/625.4, 898

[56] References Cited

U.S. PATENT DOCUMENTS

| | | | |
|---|---|---|---|
| 1,256,853 | 2/1918 | Warner | 137/898 |
| 1,688,285 | 10/1928 | Purvis et al. | 261/44 A |
| 3,087,675 | 4/1963 | Honegger | 137/625.4 |
| 3,732,851 | 5/1973 | Self | 261/DIG. 13 |
| 4,011,287 | 3/1977 | Marley | 261/DIG. 13 |
| 4,082,251 | 4/1978 | Althausen | 137/625.4 |
| 4,442,047 | 4/1984 | Johnson | 261/DIG. 13 |

FOREIGN PATENT DOCUMENTS

| | | | |
|---|---|---|---|
| 1526962 | 2/1970 | Fed. Rep. of Germany | 261/76 |
| 2544970 | 4/1977 | Fed. Rep. of Germany | 137/898 |
| 1011820 | 12/1965 | United Kingdom | 137/625.4 |
| 1042924 | 9/1966 | United Kingdom | 137/625.4 |

*Primary Examiner*—Tim Miles
*Attorney, Agent, or Firm*—Sprung Horn Kramer & Woods

[57] ABSTRACT

A valve housing in the form of a straight- or bent-passage valve accepts in the the valve seat between its steam intake and steam outlet a choking device in the form of a perforated bushing into which a cold-water pipe with jacket-side cold-water exits projects coaxially. A control piston is mounted in such a way that it can move inside the perforated bushing and around the cold-water pipe. The control surface of the piston simultaneously releases the cold-water exits in the cold-water pipe and the reduction bores in the perforated bushing, resulting in cooling of the steam and reduction of its pressure in the high steam-pressure range in accordance with load. The cold water is accordingly injected into the hot steam as it flows in and only then does the steam, enriched with cold water, pass through the reduction bores. The steam is subsequently multiply diverted in small subsidiary streams and further reduced by a downstream diversion-and-reduction unit, resulting in optimal mixture of steam and cold water, and finally a homogeneous cooled steam.

14 Claims, 4 Drawing Figures

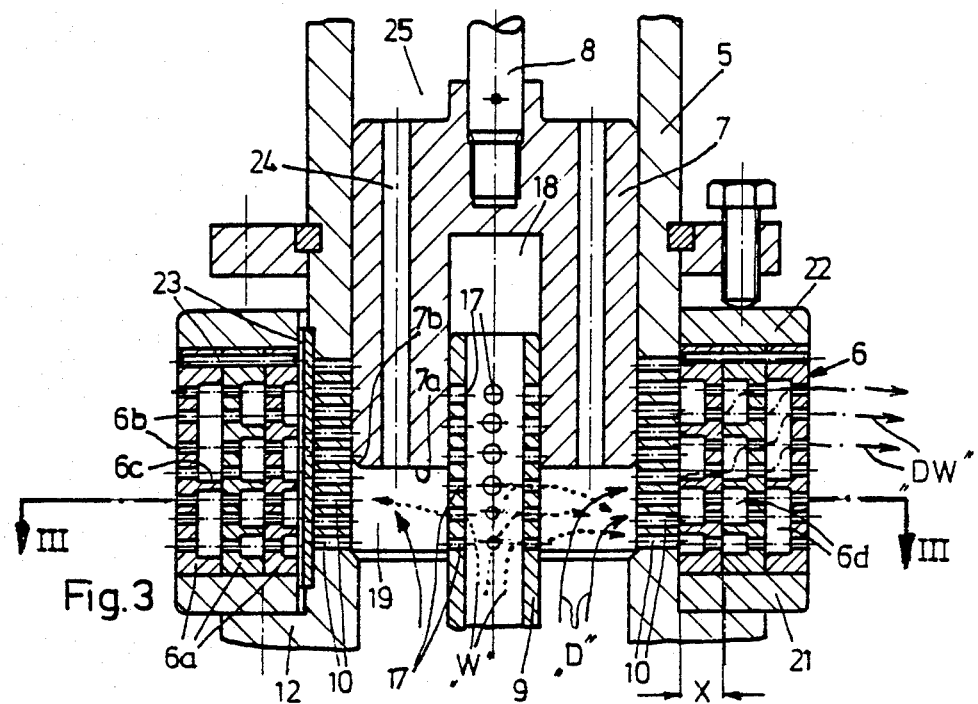
Fig.3
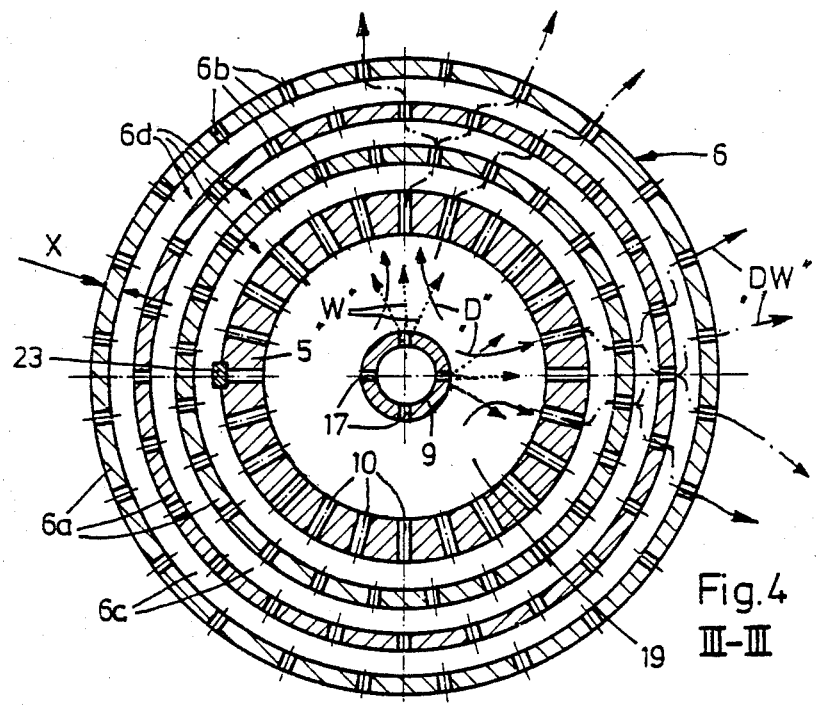
Fig.4 III-III

4,505,865

STEAM-PRESSURE REDUCTION VALVE

BACKGROUND OF THE INVENTION

The present invention relates to a steam-pressure reduction valve for cooling steam and for reducing its pressure and having both a valve housing with an intake for the hot steam and an outlet for the cooled and pressure-reduced steam and an adjustable control unit with a cold-water pipe and cold-water exits positioned between the intake and the outlet and determining the cross-section of the steam passage.

A steam-pressure reduction valve of this type is known from German Pat. No. 1 945 035. Its control unit is a reduction cone that allows steam to flow between it and a valve seat according to its stroke setting. Cold water is subsequently injected into the steam.

SUMMARY OF THE INVENTION

The object of the present invention is, with the aforesaid patent as the point of departure, a steam-pressure reduction valve that cools the steam and reduces its pressure more effectively, that is constructed from simple and long-lasting components, that is simple to assemble and disassemble, and that has wear-sensitive parts that are easy to replace.

This object is achieved in accordance with the present invention wherein a choking device is mounted coaxially around the cold-water pipe inside the valve housing and a control piston is mounted to serve as a control coaxially around the cold-water pipe inside the choking device in such a way that it can be continuously moved and has a control surface that simultaneously releases the jacket-side cold-water exits (injection bores) in the cold-water pipe and the jacket-side reduction bores in the choking device in accordance with load, resulting in load-dependent cooling and pressure reduction of the steam in the high steam-pressure range.

In another embodiment, the jacket-side cold-water exits and the jacket-side reduction bores are positioned opposite each other and extend at least almost over the same range of height in the cold-water pipe and in the choking device. The lowest row of cold-water exits or reduction bores, which are distributed around the circumference and at a distance one above another, are preferably at least almost on, and more preferably on, the same level. Further, the cross-section of the cold-water exits in the cold-water pipe gradually increases from the bottom to the top (parallel to the opening direction of the piston).

Further, the choking device is preferably a perforated bushing with reduction bores that all have the same size cross-section. The lower control surface of the control piston that can be moved up and down is preferably in itself flat and has a slanting and/or bent chamfer around its edge. The perforated bushing preferably demarcates, in conjunction with the control surface and the cold-water pipe, a mixing space for the hot steam that enters it at high pressure ($p_1$ and $t_1$) and the cold water that enters it from the nozzle-like cold-water exits in the cold-water pipe.

Moreover, the cold-water pipe preferably projects into the center of the perforated bushing with its top extending at least up to the top row of reduction bores in the perforated bushing. The perforated bushing is preferably mounted with a bearing collar at the bottom on the valve seat, with its top secured in a housing-closure plate that is attached to and can be released from the valve housing.

Still further, an additional diversion-and-reduction unit is preferably provided in the form of several nested rings with mutually offset reduction bores distributed up and down and around them is secured around and can be released from the perforated bushing, with the rings having spacers that constitute in conjunction with the reduction bores several multiply diverted reduction channels that extend radially outward. All the rings in the additional diversion-and-reduction unit preferably have the same cross-section (the same wall thickness X).

In an additional embodiment, the control piston has relief recesses in the form of bores or similar structures that penetrate it parallel to the direction of its stroke. The valve is preferably in the form of a straight-passage valve or of a bent-passage valve with a perforated basket upstream of the steam and cold-water mixing space in the valve housing and around the cold-water pipe. Moreover, the cross-section of the steam outlet is larger than that of the steam intake.

The object of the invention extends not only to the aforementioned features, but also to their combination.

The reduction valve in accordance with the invention allows steam to be cooled and its pressure to be reduced within a high steam-pressure range. Cold water is injected into the hot steam flowing into a mixing chamber in the valve at a pressure $p_1$ and temperature $t_1$, and cold water exits and hot-steam reduction cross-sections are simultaneously released. Thus, cooling and pressure reduction in the high steam-pressure range is load-dependent.

This mode of operation is obtained with a perforated bushing mounted around a cold-water pipe with jacket-side cold water exits and with a control piston mounted in such a way that it can be continuously moved within the bushing and around the cold-water pipe. Since the control surface of the piston releases the cold-water exits and reduction bores simultaneously in accordance with load, the cold water is injected upstream of the reduction cross-sections (bores in the perforated bushing) while the steam is in the high-pressure range.

The simultaneous release of the cold-water exits and the reduction cross-sections, means that the amount of cold water being injected into the hot steam will be appropriate for the pressure and speed of the steam and will optimally cool the steam and reduce its pressure.

Since the steam cooled in the mixing chamber flows through the reduction cross-sections, specifically through the bores in the perforated bushing and through multiply diverted channels in a downstream diversion and reduction unit, the steam is subjected in small subsidiary streams to multiple diversion and further pressure reduction. This ensures optimum mixture of steam and cold water. The cooled and pressure-reduced steam then flows at a pressure $p_2$ and temperature $t_2$ out of the valve housing into a connected line.

This method of cooling the steam and reducing its pressure extensively avoids the damage and breakdown to valve components that has been common up to now. The steam-pressure reduction valve in accordance with the invention is accordingly highly effective and efficient as well as low-wear and hence long-lasting.

The valve has, in keeping with its mode of operation, individual components that are simple to assemble and disassemble. Any parts (like the perforated bushing and downstream diversion and reduction unit) that are subject to wear are extremely easy to replace.

The steam-pressure reduction valve in accordance with the invention provides a method of cooling steam and reducing its pressure at a high steam-pressure range that represents an inventive step in its own right in addition to the design of the valve.

Two preferred embodiments of the invention will now be described with reference to the attached drawings, wherein:

BRIEF DESCRIPTION OF THE DRAWINGS

FIG. 3 is a longitudinal section through the steam-cooling and pressure-reduction area of either a straight- or a bent-passage valve with a control piston that can be continuously moved in a throttling direction around a cold-water pipe in accordance with the invention, and FIG. 4 is a cross-section through the steam-cooling and pressure-reduction area along the line III—III in FIG. 3.

DETAILED DESCRIPTION OF THE PREFERRED EMBODIMENTS

Figure 1:
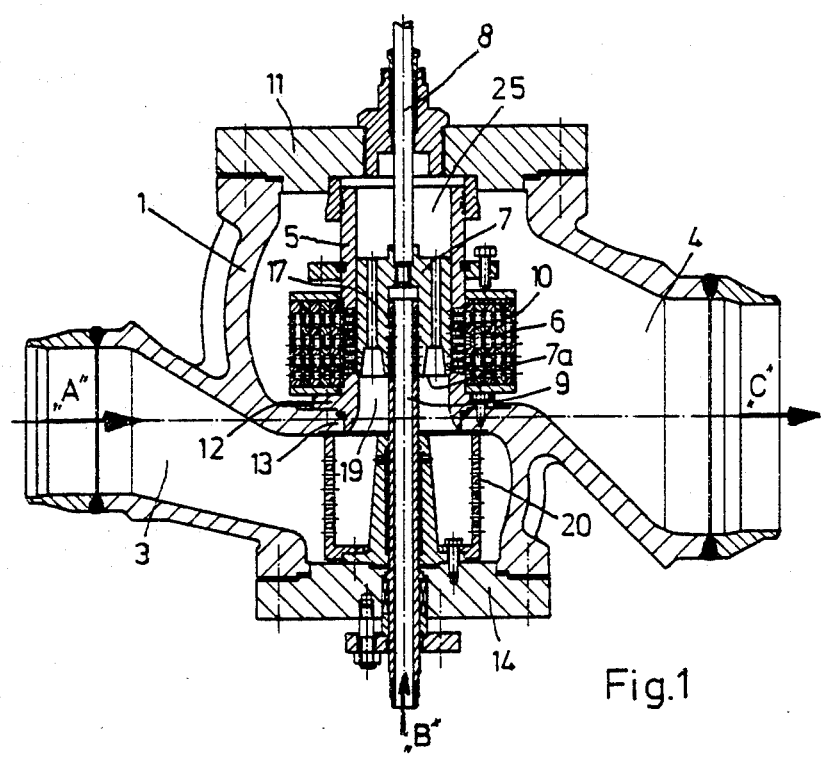
FIG. 1 is a vertical longitudinal section through a straight-passage steam-pressure reduction valve according to the invention.
Figure 2:
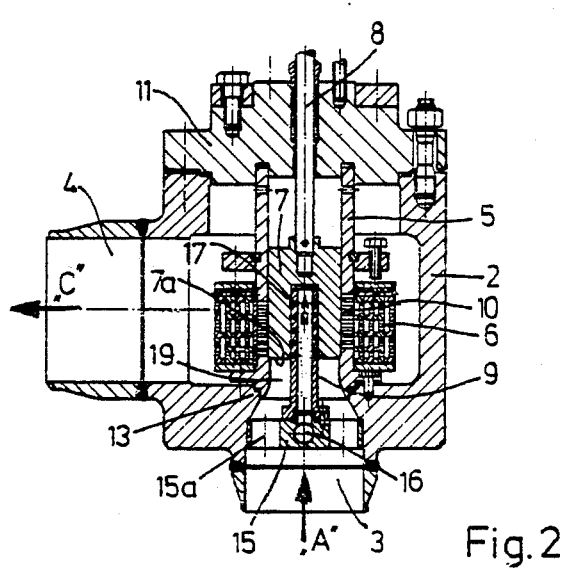
FIG. 2 is a vertical longitudinal section through a bent-passage steam-pressure reduction valve, according to the invention.

The straight-passage steam-pressure reduction valve in FIG. 1 has a valve housing 1 and the bent-passage steam-pressure reduction valve illustrated in FIG. 2 a valve housing 2. Both valves can be utilized to cool steam and reduce its pressure.

Housing 1 or 2 has a steam intake 3 and a steam outlet 4. Steam intake 3 and steam outlet 4 are positioned at an interval along a straight line in the straight-passage valve in FIG. 1 and at an angle, preferably a right angle to each other in the bent-passage valve illustrated in FIG. 2.

A steam-cooling and pressure-reduction device is positioned between steam intake 3 and steam outlet 4 in valve housings 1 and 2. The device consists of a perforated bushing 5, a diversion-and-reduction unit 6, a control piston 7 with a valve spindle 8, and a cold-water pipe 9.

An enlarged detail of the steam-cooling and pressure-reduction device in FIG. 1 is illustrated in FIG. 3 and an enlarged detail of that in FIG. 3 is illustrated in FIG. 4.

Perforated bushing 5 is cylindrical. It has a number of reduction bores 10 distributed around it part of the way along its height. It is mounted inside valve housing 1 and 2 preferably along the height of the valve and hence transverse to the steam exit (steam outlet 4). It is secured at the top with a housing-closure plate 11 and is supported at the bottom by a bearing collar 12 on a valve seat (passage) 13.

A cold-water pipe 9 is positioned extending upwardly, coaxial to and inside perforated bushing 5. In the straight-passage embodiment illustrated in FIG. 1, cold-water pipe 9 projects out of the bottom of valve housing 1 and is secured in a lower housing-closure plate 14. In the bent-passage embodiment illustrated in FIG. 2, cold-water pipe 9 is secured below perforated bushing 5 in steam intake 3 by a bearing piece 15 with steam-access recesses 15a and then extends laterally out of valve housing 2, specifically in a cold-water inflow 16.

Cylindrical control piston 7 is mounted inside perforated housing 5 and around cold-water pipe 9 in such a way that it can be continuously moved up and down. The top of piston 7 is connected to valve spindle 8, which extends out of upper housing-closure plate 11.

Perforated bushing 5 has, beginning at a distance above its bearing collar 12, reduction bores 10 along part of its height. Cold-water pipe 9 extends into perforated bushing 5 to at least the uppermost reduction bores 10. The jacket side of cold-water pipe 9 has cold-water exits (injection bores) 17 distributed around it one above another at intervals. In their vertical distribution, exits 17 lie along, and occupy at least part of, the height of reduction bores 10 (the perforated height of perforated bushing 5).

It is preferable for the cross-section of cold-water exits (injection bores) 17 to expand gradually from bottom to top in cold-water pipe 9 within a limited and load-dependent range.

It is also preferable for the lowest row of cold-water exits (injection bores) 17 along the circumference in cold-water pipe 9 to be positioned slightly lower than the lowest circumferential row of reduction bores 10 in perforated bushing 5. The reason for this will be explained subsequently.

Perforated bushing 5, control piston 7, and cold-water pipe 9 have a circular cross-section. Piston 7 is positioned to be adjustable in height, within a certain range of height that corresponds at least to the height range of reduction bores 10, inside perforated bushing 5. As it slides, a blind hole 18 in control piston 7 engages the upper end of cold water pipe 9, which has the cold-water exits (injection bores) 17 and ends within perforated bushing 5, of cold-water pipe 9.

The lower face, which is turned toward valve seat 13, of control piston 7 is in itself flat and is positioned at a right angle to the stroke of piston 7, forming a control surface 7a with a slanting or bent chamfer 7b on the jacket side. As control piston 7 executes a stroke, control surface 7a cools the steam and reduces its pressure in the high steam-pressure range inside perforated bushing 5 and hence within a steam and cold-water mixing space 19 that the bushing demarcates in conjunction with cold-water pipe 9, control surface 7a releasing injection bores 17 and reduction bores 10 to cool the steam and reduce its pressure.

In the straight-passage steam-pressure reduction valve illustrated in FIG. 1, a perforated basket 20 is positioned in the steam intake around cold-water pipe 9 and below valve seat 13.

A diversion-and-reduction unit 6 consisting of one, two, or more nested rings 6a with mutually offset reduction bores 6b around them is positioned around perforated bushing 5. Each ring 6a has a number of bores around it and over its total height and has continuous cast-on annular spacers 6c inside it. Reduction bores 6b demarcate in conjunction with the chambers 6d between spacers 6c several multiply diverted reduction channels that divert the steam and guide it outward.

All the nested cylindrical rings 6a have the same annular cross-section X and are as high as the height range of the reduction bores 10 in perforated bushing 5.

Nested rings 6a, which constitute a reduction basket, rest on a supporting ring 21 that rests in turn on the bearing collar 12 of perforated bushing 5. They are secured at the top by a screw- or spring-loaded compression ring 22. They are retained between innermost ring 6a and perforated bushing 5 and are prevented from mutually rotating axially around perforated bushing 5 by a groove-and-spring connection 23.

The primary steam (at $p_1$ and $t_1$) flows in the direction indicated by arrow A through steam intake 3 into valve housing 1 or 2 and, in the embodiment illustrated in FIG. 1, through perforated basket 20 and perforated bushing 5 into steam and cold-water mixing space 19. In the bent-passage embodiment illustrated in FIG. 2, the primary steam flows through steam intake 3, bearing piece 15, and perforated bushing 5 into steam and cold-water mixing space 19.

Control piston 7 is illustrated in FIGS. 1 and 2 in its lowest position, in which it closes off the injection bores 17 in cold-water pipe 9 and the reduction bores 10 or 6b in perforated bushing 5 or diversion-and-reduction unit 6.

Control piston 7, which is positively or non-positively connected to valve spindle 8, carries out strokes, meaning that it is moved upward into the desired or requisite opening position. Cold water flows up through cold-water pipe 9 in the direction indicated by arrow B and arrives at the closed injection bores 17.

In accordance with the amount of steam to be controlled, the control surface 7a of control piston 7 simultaneously releases more or less bores 17 or 10 in cold-water pipe 9 or perforated bushing 5 (see FIG. 3). The necessary cold water can then exit in a jet through the bores 17 released by control surface 7a from cold-water pipe 9 and is injected into steam and cold-water mixing space 19, where it is mixed with the primary steam (see arrow W for the cold water and arrow D for the hot steam in FIG. 3).

The water is injected into the primary steam, in the steam and cold-water mixing space 19 in perforated bushing 5, that is, upstream of the reduction cross-sections (bores 10 and 6b), before the primary steam can flow into bores 17 and 6b to be reduced, that is.

The injection bores 17 in the lowest row in cold-water pipe 9 are accordingly slightly lower than the bores 10 in the lowest row in perforated bushing 5, so that injection bores 17 are released before reduction bores 10. They can, however, also be positioned at the same height as illustrated in FIG. 3, so that bores 17 are released at the same time as bores 10.

When injection bores 17 are lower, the bent chamfer 7b on control piston 7 can release both bores 17 and 10 at the same time so that both bores can in a practical way always be released simultaneously to cool the primary steam.

Control piston 7 can thus inject cold water into the primary steam in the high-pressure range inside diversion-and-reduction unit 6 before the pressure is reduced in bores 10 and 6b.

The cooled and pressure-reduced steam ($p_2$ and $t_2$) can now in accordance with the stroke of control piston 7, of its control surface 7a, that is, flow through the bores 10 in perforated bushing 5 and through the bores 6b in the downstream diversion-and-reduction unit 6 (perforated cylinder consisting of nested rings 6a) to steam outlet 4.

Since the cooled steam is subjected in small subsidiary streams to several diversions and further reduction in the bores 6b of downstream diversion-and-reduction unit 6, the steam and cold water are optimally mixed together at this point (arrow DW in FIGS. 3 and 4 for the reduced and cooled mixed steam).

Since the cross-section of steam intake 3 is larger than that of steam outlet 4, the relaxed steam can flow off out of valve housing 1 or 2 very easily.

Since control surface 7a is subjected to a high load in steam and cold-water mixing space 19 by the primary steam (in the high steam-pressure range) and since valve spindle 8 must accordingly exert a lot of force to move control piston 7, it is preferable for the piston 7 to have relief bores 24 or other recesses that penetrate it parallel to its stroke so that the steam pressure in space 19 can expand through them against the piston surface opposite control surface 7a as well and hence in the space 25 between piston 7, perforated bushing 5, and housing-closure plate 11 in order to relieve the piston and compensate for the pressure.

The steam-pressure reduction valve in accordance with the invention is especially simple to assemble and diassemble. The practical arrangement of perforated bushing 5, diversion-and-reduction unit 6 (or nested rings 6a), and control piston 7 in particular make it quick and easy to replace the wear-sensitive parts, perforated bushing 5 and rings 6a for example, because these parts can be removed from valve housing 1 or 2 upwards by loosening upper housing-closure plate 11 and new parts inserted from the top.

It will be appreciated that the instant specification and claims are set forth by way of illustration and not limitation, and that various modifications and changes may be made without departing from the spirit and scope of the present invention.

What is claimed is:

1. In a steam-pressure reduction valve for cooling steam and for reducing its pressure and having a valve housing with an intake for the hot steam and an outlet for the cooled and pressure-reduced steam and adjustable control means comprising a cold-water pipe and cold-water exits positioned between the intake and the outlet for determining the cross-section of the steam passage, the improvement wherein the control means comprises: choking means mounted coaxially around the cold-water pipe and inside the valve housing and having reduction bores therein and a control piston mounted coaxially around the cold-water pipe inside the choking means for continuous movement and having a control surface for simultaneously releasing the cold-water exits in the cold-water pipe and the jacket-side reduction bores in the choking means in accordance with load, whereby load-dependent cooling and pressure reduction of the steam in the high steam-pressure range is obtained.

2. The valve as in claim 1, wherein the cold-water exits and the reduction bores are positioned opposite each other and extend at least almost over the same range of height in the cold-water pipe and in the choking means.

3. The valve as in claim 1, wherein the lowest row of cold-water exits or reduction bores, which are distributed around the circumference and at a distance one above another, are at least almost on, the same level.

4. The valve as in claim 1, wherein the cross-section of the cold-water exits in the cold-water pipe gradually increases from the bottom to the top.

5. The valve as in claim 1, wherein the choking means comprises a perforated bushing with reduction bores that all have the same size cross-section.

6. The valve as in claim 1, wherein the lower control surface of the control piston is flat and has a slanting chamfer around its edge.

7. Th valve as in claim 5, wherein the perforated bushing demarcates in conjunction with the control surface and the cold-water pipe, a mixing space for the hot steam that enters it at high pressure and the cold water that enters from the cold-water exits in the cold-water pipe.

8. The valve as in claim 5, wherein the cold-water pipe projects into the center of the perforated bushing with its top extending at least up to the top row of reduction bores in the perforated bushing.

9. The valve as in claim 5, further comprising a valve seat, a bearing collar on the valve seat, a housing-closure plate releasably attached to the valve housing and wherein the bushing is attached at its bottom to the bearing collar and at its top to the plate.

10. The valve as in claim 5, further comprising an additional diversion-and-reduction unit comprising several nested rings with mutually offset reduction bores distributed up and down and around them and releasably secured around the perforated bushing, with the rings having spacers that constitute in conjunction with the reduction bores several multiply diverted reduction channels that extend radially outward.

11. The valve as in claim 10, wherein all the rings in the diversion-and-reduction unit have the same cross-section.

12. The valve as in claim 1, wherein the control piston has relief recesses that penetrate it parallel to the direction of its stroke.

13. The valve as in claim 7, wherein the valve is one of a straight-passage valve or of a bent-passage valve with a perforated basket upstream of the steam and cold-water mixing space in the valve housing and around the cold-water pipe.

14. The valve as in claim 1, wherein the cross-section of the steam outlet is larger than that of the steam intake.

* * * * *